US009341264B2

(12) United States Patent
Burtt

(10) Patent No.: US 9,341,264 B2
(45) Date of Patent: May 17, 2016

(54) TOROIDAL CONTINUOUSLY VARIABLE TRANSMISSION

(75) Inventor: David John Burtt, Eccleston (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 485 days.

(21) Appl. No.: 13/511,985

(22) PCT Filed: Nov. 23, 2010

(86) PCT No.: PCT/GB2010/051949
§ 371 (c)(1),
(2), (4) Date: Oct. 8, 2012

(87) PCT Pub. No.: WO2011/064572
PCT Pub. Date: Jun. 3, 2011

(65) Prior Publication Data
US 2013/0017925 A1    Jan. 17, 2013

(30) Foreign Application Priority Data
Nov. 24, 2009  (GB) .................................. 0920546.9

(51) Int. Cl.
*F02B 39/04* (2006.01)
*F16H 61/664* (2006.01)
(Continued)

(52) U.S. Cl.
CPC .............. *F16H 63/067* (2013.01); *F16H 15/38* (2013.01); *F16H 61/6648* (2013.01); *F16H 61/6649* (2013.01)

(58) Field of Classification Search
CPC ... F16H 15/38; F16H 61/6648; F16H 63/067; F16H 61/6649

USPC ................................. 476/40, 41, 42, 45, 48, 1
See application file for complete search history.

(56) References Cited

U.S. PATENT DOCUMENTS 2,850,910 A   9/1958   Kraus .......................... 74/190.5
2,850,920 A   9/1958   Kraus .......................... 74/665 R
(Continued)

FOREIGN PATENT DOCUMENTS

JP   H05-203007   8/1993
JP   2002-227950  8/2002
(Continued)

OTHER PUBLICATIONS

International Preliminary Report on Patentability in International Application No. PCT/GB2010/051949 issued May 30, 2012.
(Continued)

*Primary Examiner* — David M Fenstermacher
(74) *Attorney, Agent, or Firm* — Norton Rose Fulbright US LLP

(57) ABSTRACT

A variator has an input shaft (18), an input disc (10) mounted coaxially with the input shaft and rotatable by the input shaft, an output disc (12) facing the input shaft (18) and being mounted coaxially with the input disc, a toroidal cavity defined between the input and output discs and a plurality of rollers (14, 16) located in the toroidal cavity, in rolling contact with the input and output discs (10, 12), each of the rollers being mounted on a roller carriage (17). The variator has means (34) for applying an end load to the variator to urge the rollers (14, 16) into contact with the input and output discs (10, 12) and resiliently deformable means for applying a reaction force to each of the roller carriages.

22 Claims, 9 Drawing Sheets

(51) Int. Cl.
  *F16H 63/06* (2006.01)
  *F16H 15/38* (2006.01)

(56) References Cited

U.S. PATENT DOCUMENTS

| | | | | |
|---|---|---|---|---|
| 4,428,246 | A * | 1/1984 | Horton | F16H 15/38 |
| | | | | 476/41 |
| 4,744,261 | A * | 5/1988 | Jacobson | F16H 15/52 |
| | | | | 475/189 |
| 5,895,337 | A * | 4/1999 | Fellows | F16H 61/664 |
| | | | | 476/10 |
| 2001/0023215 | A1* | 9/2001 | Misada | 476/10 |
| 2003/0087722 | A1* | 5/2003 | Visscher | 476/40 |
| 2005/0009664 | A1* | 1/2005 | Greenwood et al. | 476/46 |
| 2006/0160656 | A1* | 7/2006 | Dutson | 476/40 |
| 2006/0189435 | A1* | 8/2006 | Flaig et al. | 476/40 |
| 2008/0009386 | A1* | 1/2008 | Harada et al. | 476/40 |
| 2009/0044532 | A1 | 2/2009 | Wu | 60/608 |
| 2011/0028267 | A1* | 2/2011 | Fairhurst et al. | 476/40 |
| 2011/0230306 | A1* | 9/2011 | Oliver et al. | 476/40 |
| 2013/0045831 | A1* | 2/2013 | Greenwood et al. | 476/40 |
| 2013/0260954 | A1* | 10/2013 | Arai et al. | 476/40 |
| 2014/0135167 | A1* | 5/2014 | Durack | 476/40 |
| 2014/0378272 | A1* | 12/2014 | De Freitas et al. | 476/40 |

FOREIGN PATENT DOCUMENTS

| | | |
|---|---|---|
| JP | 2004-278740 | 10/2004 |
| JP | 2007-528963 | 10/2007 |

OTHER PUBLICATIONS

Search Report in International Application No. PCT/GB2010/051949 issued Jun. 3, 2011.

* cited by examiner

TOROIDAL CONTINUOUSLY VARIABLE TRANSMISSION

CROSS-REFERENCE TO RELATED APPLICATIONS

This application is a national phase application under 35 U.S.C. §371 of International Application No. PCT/GB2010/051949, filed Nov. 23, 2010, which claims priority Great Britain Application No. 0920546.9, filed Nov. 24, 2001. The entire text of each of the above-referenced applications is specifically incorporated by reference without disclaimer.

The present invention relates to infinitely variable ratio transmission apparatus of the toroidal race rolling traction type, hereinafter referred to as a variator.

The basic form of variator comprises a toroidally-recessed input disc rotated by an input drive shaft and a toroidally-recessed output disc arranged coaxially with respect to the input disc. A plurality of rollers is provided in the toroidal cavity defined between the input and output discs and power is transmitted between the input disc and the output disc by means of the rollers. An elasto-hydrodynamic oil film is present between the rollers and the input and output discs. The properities of the elasto-hydrodynamic fluid are such that when the fluid is compressed it becomes highly viscous, such that as pressure is exerted at the contact point between the rollers and the discs, the oil transmits power from one to the other.

In order to transmit the torque via the elasto-hydrodynamic fluid, it is necessary to clamp the rollers between the input and output discs. It is important that the correct clamping force (known as the "end load") is applied. An excessive end load will reduce efficiency and impair the durability of the variator. Insufficient end load will result in sliding contact between the rollers and the input and output discs.

Rollers are mounted on roller carriages which pivot such that the points of contact of the rollers on the input and output discs can be adjusted in order to alter the effective ratio of the variator. In a so-called torque controlled variator, transverse forces are applied to the roller carriages which are typically applied by means of double-acting hydraulic pistons in relatively high power, high torque applications or by means of a lever on which a pair of roller carriages is mounted, each of which carries a single roller. In a torque-controlled variator, the effective ratio of the variator is dependent upon the input and output torques on the variator, and the transverse forces applied to the rollers.

In a so-called ratio-controlled variator, the inclination of the rollers is specified, so that the effective ratio of the variator is defined without reference to the values of the torques on the variator.

Many variators have sophisticated control regimes for ensuring the optimum operation of the variator. However, such control regimes tend to be relatively expensive and indeed may be excessively sophisticated in less demanding applications, for example if the variator is to be used to drive an auxiliary engine appliance.

It is therefore an aim of the present invention to provide a simplified variator which is particularly suitable for such low-torque applications.

In accordance with a first aspect of the invention, a variator comprises:
an input shaft;
an input disc mounted coaxially with the input shaft and rotatable by the input shaft;
an output disc facing the input shaft and being mounted coaxially with the input disc;
a toroidal cavity defined between the input and output discs;
a plurality of rollers located in the toroidal cavity, in rolling contact with the input and output discs, each of the rollers being mounted on a roller carriage;
means for applying an end load to the variator to urge the rollers into contact with the input and output discs; and resiliently deformable means for applying a reaction force to each of the roller carriages.

It has been found that use of a resiliently deformable means for applying the reaction force can in some circumstances provide a very good approximation of the required reaction force, for example if the variator is used to drive an auxiliary engine appliance such as a supercharger.

Preferably, the resiliently deformable means is unpowered.

More preferably, the resiliently deformable means comprises spring means.

The variator may further comprise stop means for limiting the travel of the roller carriages.

The stop means may limit the travel of the roller carriages in a first direction and/or in a second direction.

In one embodiment, a common stop means limits the travel of a plurality of roller carriages.

The stop means may comprise a pivotally mounted member through which a roller carriage passes, the roller carriage having an engagement portion which limits the extent to which the roller carriage can pass through the pivotally mounted member and the pivotally mounted member being engageable with one or more abutment means which limit its pivotal movement.

The variator may comprise adjustable abutment means.

The variator may comprise cam means engageable with the pivotally mounted member.

The variator preferably comprises a housing and the pivotally mounted member is preferably pivotally mounted with respect to the housing.

The variator may further comprise damping means for damping the motion of a roller carriage.

The means for applying an end load may also transfer torque from the input shaft to the input disc and/or may also transfer torque from the output disc to the output shaft.

The end load means may comprise abutment means rotatable with, and displaceable longitudinally with respect to, the input shaft and angularly displaceable with respect to the input disc, and camming means for displacing the abutment means longitudinally with respect to the input shaft on relative angular displacement of the abutment means and the input disc.

The camming means preferably comprises a plurality of rotatable elements, each of which is movable along a track of varying depth located in the abutment means.

The rotatable elements may comprise balls.

The variator may further comprise a track of varying depth located in an outer face of the input disc.

The abutment means may comprise plate means slidably disposed on the input shaft.

The input and output discs preferably each comprise a profiled inner face with which the rollers are in rolling contact, wherein the profiled inner faces of the input and output discs are not identical.

In one embodiment, the variator is at its minimum ratio when the rotational axis of the rollers is perpendicular to the rotational axis of the input and output discs.

In one arrangement, the minimum ratio of the variator transmission is −1. However, the minimum ratio may have a different value, e.g. −0.4.

In accordance with a second aspect of the present invention, there is provided, in combination, a variator and supercharger means driven by the variator, the variator comprising:

an input shaft adapted to be driven by an internal combustion engine to the input of which the supercharger means is adapted to supply air for combustion;

an input disc mounted coaxially with the input shaft and rotatable by the input shaft;

an output disc facing the input shaft and being mounted coaxially with the input disc, the output disc being connected to the supercharger means;

a toroidal cavity defined between the input and output discs;

a plurality of rollers located in the toroidal cavity, in rolling contact with the input and output discs; and means for applying an end load to the variator to urge the rollers into contact with the input and output discs;

the variator comprising a torque-controlled variator.

Preferably the variator of the combination comprises a variator in accordance with the first aspect of the present invention.

In accordance with a third aspect of the present invention, there is provided a variator transmission comprising:

an input shaft;

an input disc mounted coaxially with the input shaft and being angularly displaceable with respect to the input shaft;

an output disc facing the input disc and being mounted coaxially with the input shaft;

a toroidal cavity defined between the input and output discs;

a plurality of rollers located in the toroidal cavity, in rolling contact with the input and output discs;

roller carriage means on which the rollers are mounted;

means for adjusting the roller carriages means to set the inclination of the rollers; and end load means mounted on the input shaft for rotation therewith, the end load means acting on the input disc to urge the rollers and the input and output discs into contact and also transferring torque from the input shaft to the input disc.

This results in a simplified transmission which is particularly suitable for applications where the end load needs to be dependent only on the input torque and does not need to be dependent on the output torque or vice versa, i.e. where the end load needs to be dependent only on the output torque and does not need to be dependent on the input torque.

The end load means preferably comprises abutment means rotatable with, and displaceable longitudinally with respect to, the input shaft and angularly displaceable with respect to the input disc, and camming means for displacing the abutment means longitudinally with respect to the input shaft on relative angular displacement of the abutment means and the input disc.

The camming means preferably comprises a plurality of rotatable elements, each of which is movable along a track of varying depth located in the abutment means by relative angular displacement of the abutment means and the input disc.

In a preferred embodiment, the rotatable elements comprise balls.

There may also be a track of varying depth located in an outer face of the input disc.

The abutment means may comprise plate means may slidably disposed on the input shaft.

The variator transmission may further comprise adjustment means for varying the inclination of the plurality of rollers identically.

Preferably, each roller carriage means is mounted for angular displacement.

In one embodiment, each roller carriage is mounted for displacement about an axis perpendicular to the rotational axis of the roller mounted on it.

The variator transmission may further comprise gear means to which each roller means is connected and means for rotating the gear means.

The variator transmission may further comprise a toothed movable control rod which engages a plurality of said gear means.

The input and output discs preferably each comprise a profiled inner face with which the rollers are in rolling contact, wherein the profiled inner faces of the input and output discs are not identical.

In one embodiment, the variator is at its minimum ratio when the rotational axis of the rollers is perpendicular to the rotational axis of the input and output discs.

In one embodiment, the minimum ratio of the variator transmission is −1. However, the minimum ratio may have a different value, e.g. −0.4.

In accordance with a fourth aspect of the present invention, there is provided a variator transmission comprising:

a rotatably mounted input disc having a profiled inner face;

a rotatably mounted output disc having a profiled inner face facing the profiled inner face of the input disc and being rotatable coaxially with the input disc;

a toroidal cavity defined between the input disc and the output disc;

a plurality of rollers located in the toroidal cavity, in rolling contact with the profiled inner faces of the input and output discs; and means for adjusting the inclination of the plurality of rollers;

wherein the profiled inner faces of the input and output discs are not identical.

The non-identical nature of the opposed profiled inner faces of the input and output discs allows the ratio range of the transmission to be tailored to suit a particular application, for example if the transmission is only required to output a positive ratio.

In a preferred embodiment, the variator is at its minimum ratio when the rotational axis of the rollers is perpendicular to the rotational axis of the input and output discs.

In one embodiment, the minimum ratio of the variator transmission is −1. However, the minimum ratio may have a different value, e.g. −0.4.

By way of example only, specific embodiments of the present invention will now be described with reference to the accompanying drawings, in which.

Figure 1:
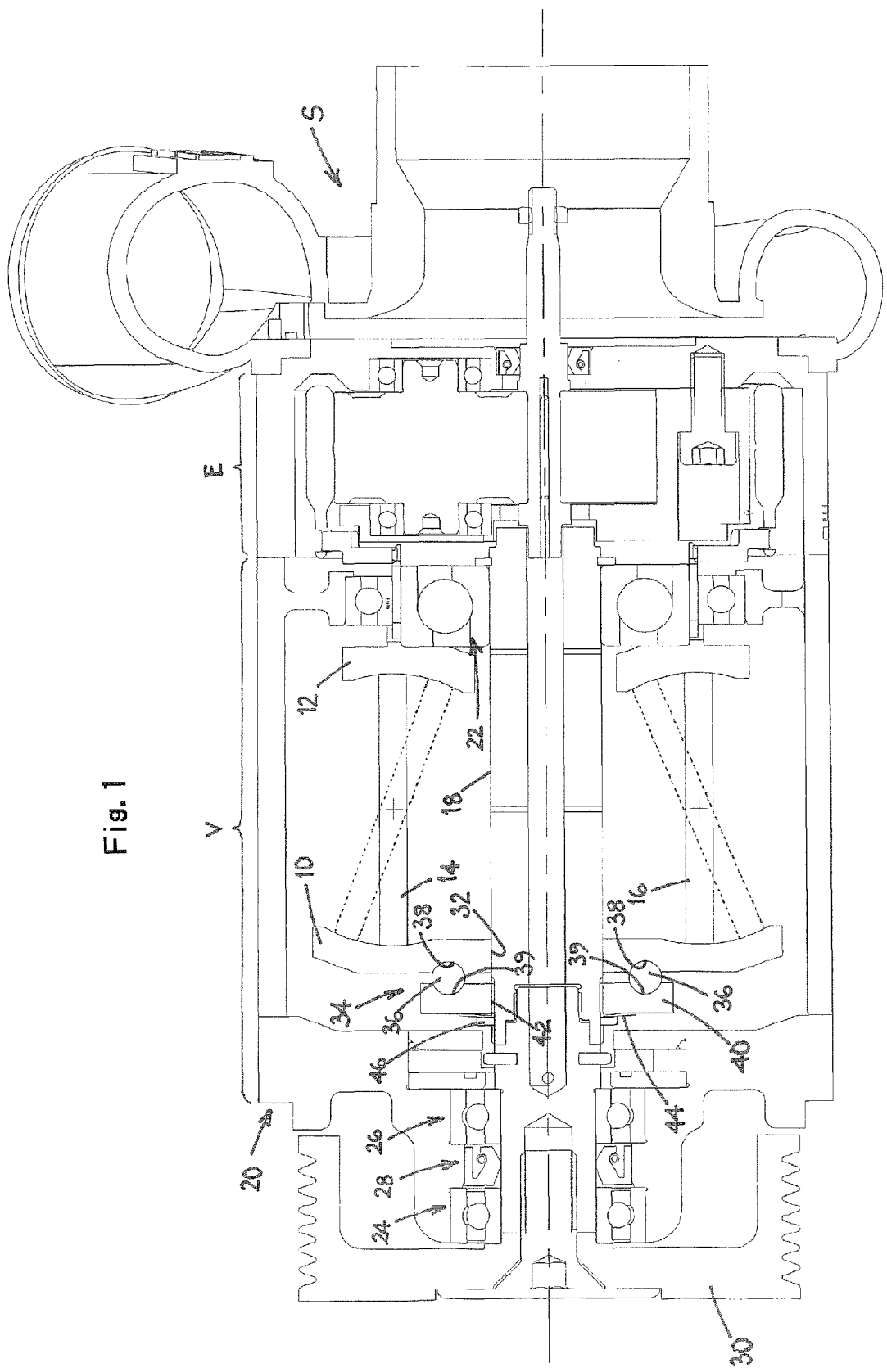
FIG. 1 is a longitudinal cross section through a first embodiment of variator driving a supercharger, in accordance with the present invention.
Figure 2:
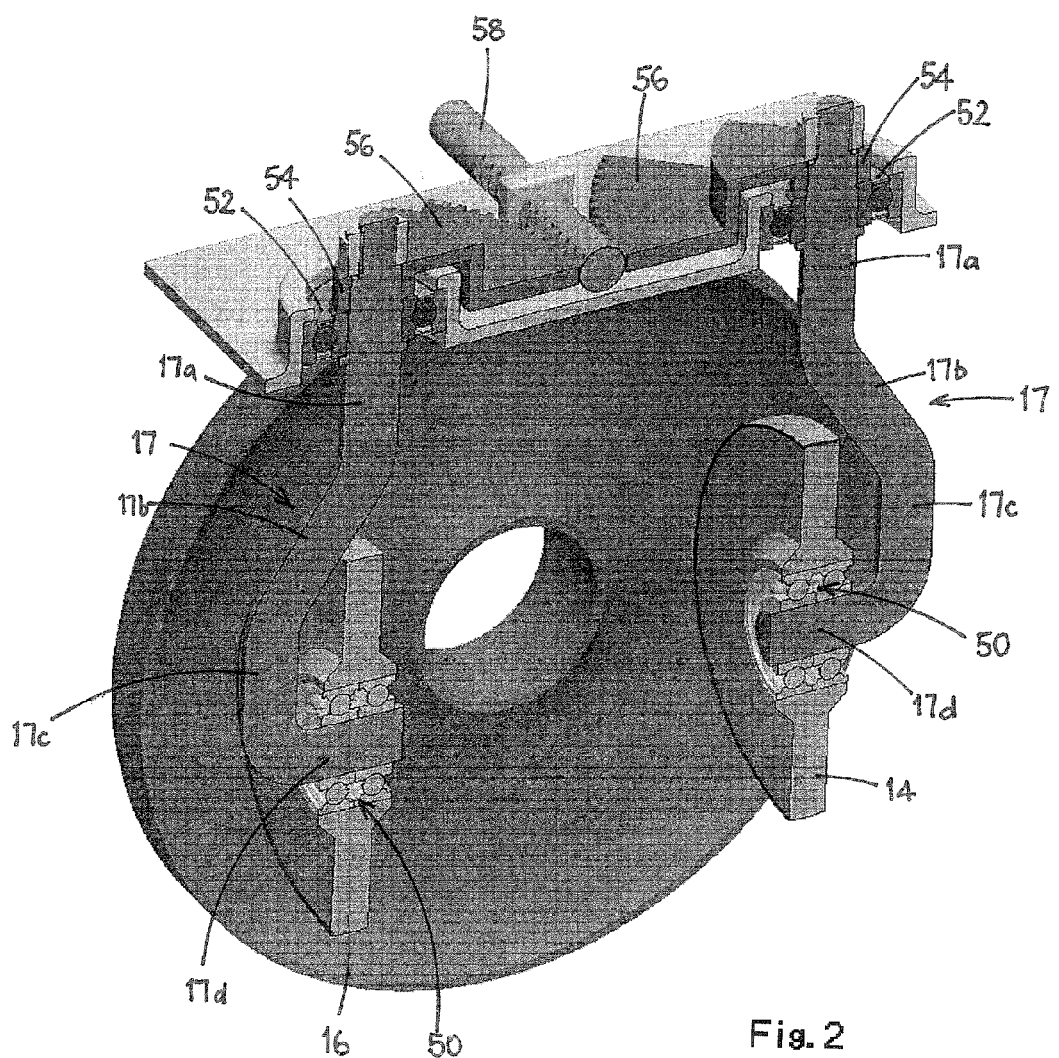
FIG. 2 is a cut-away perspective view illustrating the roller control of the variator of FIG. 1.
Figure 3:
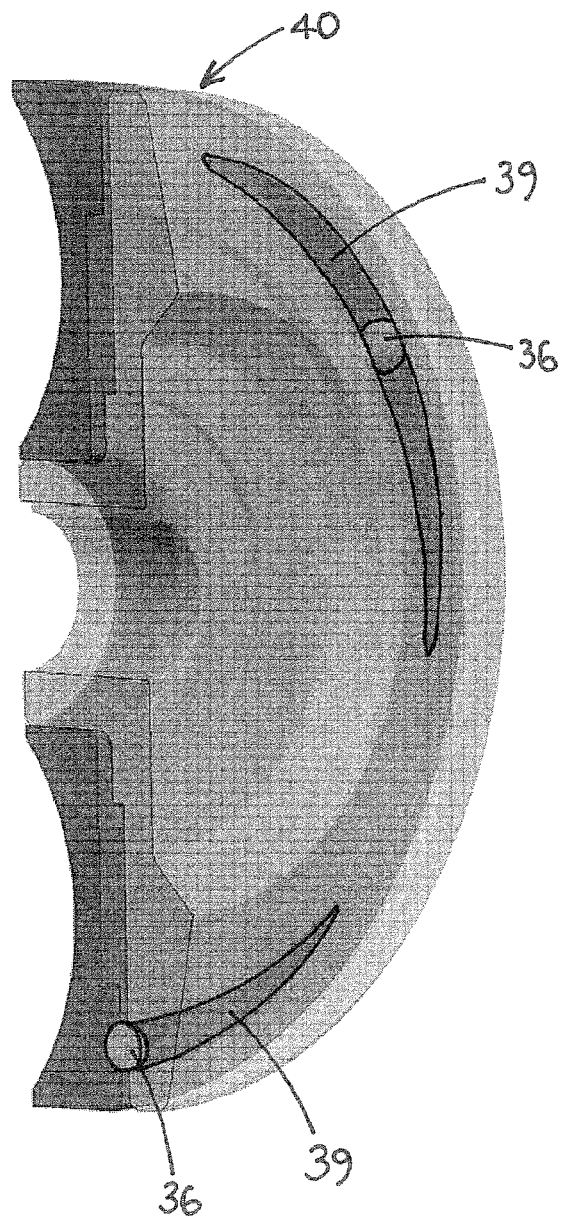
FIG. 3 is a perspective view illustrating part of the arrangement for applying an end load to the disc.

FIGS. 1 to 3 illustrate a supercharger S for an internal combustion engine, connected to, and driven by, a first embodiment of continuously variable transmission system in the form of a variator V via an epicyclic gear set E. The supercharger is entirely conventional and need not be described in detail. The variator V comprises a toroidally-recessed input disc 10 facing a toroidally-recessed output disc 12. Two rollers 14, 16 are rotatably mounted on one end of respective roller carriages 17 (see FIG. 2) in the toroidal cavity defined between the opposed toroidally-recessed faces of the input and output discs 10, 12, to transmit drive from the input disc 10 to the output disc 12 with a ratio which is variable by tilting the rollers 14, 16. The drive is actually transmitted by a very thin layer of elasto-hydrodynamic fluid between the rollers 14, 16 and the opposed profiled inner faces of the input and output discs 10, 12. The significant characteristic of elasto-hydrodynamic fluid is that it becomes highly viscous when pressure is applied to it, allowing torque to be transmitted between the input and output discs and the rollers.

The input disc 10 is mounted coaxially with, but is not rotated directly by, an input shaft 18 which passes through the input disc 10 and through the housing 20 of the variator. The input shaft 18 is hollow and its inner end is secured to one side of a thrust bearing 22. The opposite end is mounted by means of two sets of bearings 24, 26 located within the housing, between which an annular seal 28 is mounted. The input shaft 18 is rotatable by means of a pulley 30 which is rotated by means of a belt driven by the output of an engine.

The input shaft 18 passes through a circular aperture 32 in the centre of the input disc 10. An end-load arrangement illustrated generally at 34 applies a force in a direction parallel to the rotational axis of the variator (known as the end load) to the input disc 10, in proportion to the input torque. The end load compresses the elasto-hydrodynamic fluid at the points of contact between the input and output discs 10, 12 and the rollers 14, 16 and allow torque to be transmitted. The end load mechanism 34 also transmits torque from the input shaft 18 to the input disc 10, as will be explained.

The end load mechanism 34 comprises three spherical balls 36 mounted in profiled part-circular running tracks 38, 39 formed in the outer face of the input disc 10 and in the inner face of a supporting back plate 40. The tracks 38, 39 extend from just less than 120°, are equally angularly spaced and are at a constant diameter. The depth of the tracks 38, 39 varies smoothly along the tracks from a minimum depth at one end to a maximum at the opposite end and the tracks in the input disc and the back plate are reversed, so that when the balls 36 are at the minimum depth at one end of the tracks in one of the input disc 10 and back plate 40, they are at the maximum depth at one end of the tracks in the other of the input disc and back plate. The supporting back plate 40 is mounted on, and rotates with the input shaft 18 by means of a splined connection 42, which allows the back plate 40 to move along the input shaft 18. A conical Belville washer 44 extends between the outer face of the back plate 40 and a retaining circlip 46 on the outer surface of the input shaft 18 in order to provide a preload, thereby producing a minimum end load.

In use, the input pulley 30 is rotated which applies an input torque to the input shaft 18. The back plate 40 of the end load mechanism 34 rotates with the input shaft 18 whereas the input disc 10 does not, although the input disc 10 can move angularly with respect to the input shaft 18, subject to the restrictions of the back plate 40 and the rollers 14, 16. Consequently, as the input shaft 18 rotates, the back plate 40 rotates slightly with respect to the input disc 10, thereby causing the balls 36 to travel along their running tracks 38 to an extent proportional to the applied torque thereby providing an axial end load on the input disc 10 proportional to the input torque and also causing the input disc 10 to rotate. At constant end load, the input disc 10 therefore rotates at the same speed as the input shaft 18, with torque being transmitted from the input shaft 18 to the input disc 10 via the end load mechanism 34.

The rotation of the input disc 10 is transmitted via the rollers 14, 16 to the output disc 12, the rotation of the output disc 12 being transmitted to the annulus of a conventional traction epicyclic gear set E which is arranged to rotate the drive shaft of the conventional supercharger.

The effective ratio Rv of the variator is determined by adjusting the angle of inclination of the rollers 14, 16, thereby changing the contact points of the rollers on the inputs discs 10 and output discs 12. This is achieved by adjusting the position of a control rod 58 which may be displaced, for example, by a stepper motor. As a result, the output speed of the variator output disc 12 with respect to the input speed of the variator input shaft 19 can be specified precisely. The rotational output of the variator is then transmitted to the epicyclic gear set E, which in turn rotates the input shaft of the supercharger S.

The rollers 14, 16 are mounted on diametrically opposed sides of the rotational axis of the input and output discs 10, 12. Each roller carriage 17 is formed from a metal rod of circular cross section having a radially outer straight portion 17a merging with a first outwardly inclined intermediate portion 17b which in turn merges with a second intermediate portion 17c parallel to, but offset with respect to, the first portion. The second intermediate portion 17c merges with a roller mounting portion 17d which extends perpendicularly to the second intermediate portion and which receives a bearing 50 by means of which the rollers 14, 16 are mounted. The roller carriage 17 is therefore in the form of a rod which assumes the general shape of a question mark.

The upper portion 17a of each roller carriage 17 passes through the variator housing 20 and is rotatably mounted with respect to the housing by means of a bearing 52. The end of each roller carriage projecting through the housing is also secured to a collar 54 which is fixed to a respective sector gear 56 which meshes with a toothed control rod 58 extending, and being displaceable, parallel to the rotational axis of the variator. Displacement of the control rod 58 causes the sector gears 56 to pivot through a corresponding angle which in turn causes the roller carriages 17 to pivot and thereby moves the position of the rollers 14, 16 with respect to the input and output discs 10, 12, thereby altering the effective ratio of the variator.

It will also be observed that, in the particular arrangement described, the roller-engaging faces of the input and output discs, 10, 12 are assymetrical and non-identical. In the position illustrated in FIG. 1, with the rollers 14, 16 in the "zero" position, lying parallel to the rotational axis of the variator, the rollers at the minimum radius of the input disc 10 and the maximum radius of the output disc 12. As the position of rollers is moved as described above, they can be moved to the other extreme position, shown in dotted lines in FIG. 1, in which the rollers are located near the maximum possible radius of the input disc and the minimal possible radius of the output disc. This ensures that the output ratio of the variator is always greater than or equal to 1.

As the torque applied to the input shaft 18 of the variator varies, the relative rotation of the back plate 40 and the input disc 10 changes, thereby varying the position of the balls 36 along their respective tracks 38 and thereby varying the end load applied to the input disc to correspond with the applied torque.

As mentioned previously, the roller-engaging faces of the input and output discs 10, 12 are not identical. In the current application, where the variator V drives a supercharger S, the variator V will only be required to produce a positive ratio, greater than 1, and there is therefore no requirement for the variator V to be able to produce a ratio lower than one. Consequently, the input and output disc surfaces 10, 12 are arranged so that when the rollers 14, 16 are in contact with the smallest diameter of the input disc 10 and the largest diameter of the output disc 12, the output ratio Rv of the variator V is 1 and the rollers are then adjustable to increase the variator output ratio Rv to a ratio greater than 1 by engaging the radially outer portions of the input disc 10 and radially inner portions of the output disc 12.

In the embodiment of FIGS. 1 to 3, the variator is "ratio controlled", i.e. the inclination of the rollers 14, 16 is set to the desired angle by appropriate adjustment of the control rod 58. In the embodiment of FIGS. 4 to 9, the variator is "torque controlled", i.e. rather than setting the inclination of the rollers, a reaction force is applied to the roller carriage, whereby the inclination (ratio) of the rollers is a direct result of the sum of the reaction force and the tangential forces on the roller from the input and output discs 10, 12.

In the embodiments of FIGS. 4 to 9, the construction of the variator and its connection to the supercharger is identical in all respects to that of the first embodiment, except for the roller control mechanisms. Consequently, in the following description of the embodiments of FIGS. 4 to 9 only the features of the roller control mechanism will be described.

Figure 4:
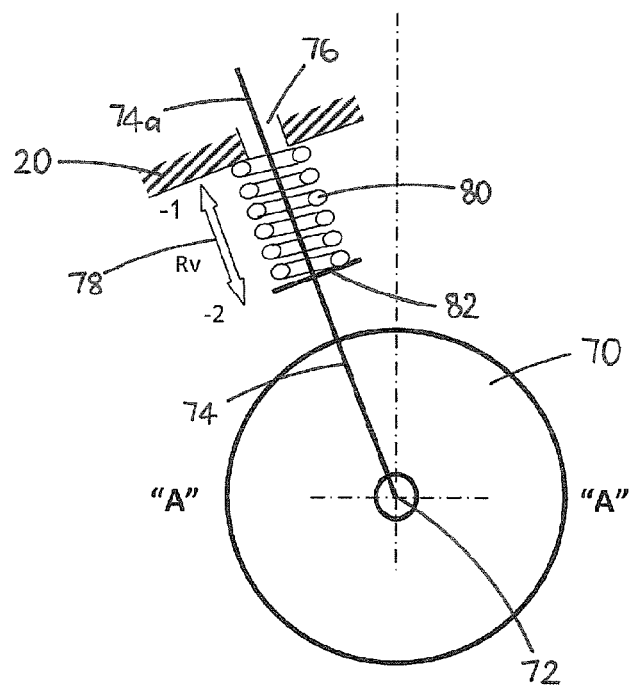
FIG. 4 illustrates the roller control mechanism of a second embodiment of variator in accordance with the present invention.

In the embodiment of FIG. 4, only a single roller 70 is illustrated, but the same control mechanism is applied to each roller of the variator. The roller 70 is mounted on a stub axle 72 which in turn is mounted on a roller carriage 74. The stub axle 72 and roller carriage can, for example, be in the form of the angled roller carriage 17 of the first embodiment. The roller carriage terminates in a straight section 74a which passes through a guide aperture 76 in the housing 20 of the variator, whereby the roller carriage is constrained to be displaceable longitudinally in the direction of the straight section 74a, as indicated by arrows 78. A compression spring 80 is disposed around the straight section 74a of the roller carriage 74, between the housing 20 and a stop 82 on the roller carriage.

In the FIG. 4 arrangement, as the supercharger speed increases, so does its power requirement. This requires an increased reaction force at the roller 70, which is achieved by compression of the spring 80. A consequence of the spring compression is that the variator ratio moves towards its minimum value. By matching the spring rate to the impeller characteristics, it becomes possible to create a desired supercharger speed profile with engine speed.

Figure 5:
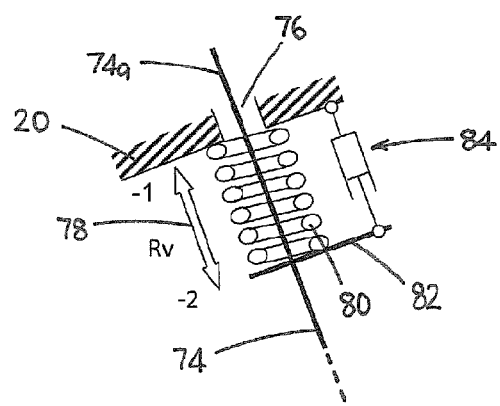
FIG. 5 illustrates the roller control mechanism of a third embodiment of variator in accordance with the present invention.

A variation of the embodiment of FIG. 4 is illustrated in FIG. 5. The embodiment of FIG. 5 is identical to that of FIG. 4, except that the movement of the roller carriage (and therefore of the roller) is damped, by means of a damper 84 mounted between the housing 20 of the variator and the stop 82 on the roller carriage.

Figure 6:
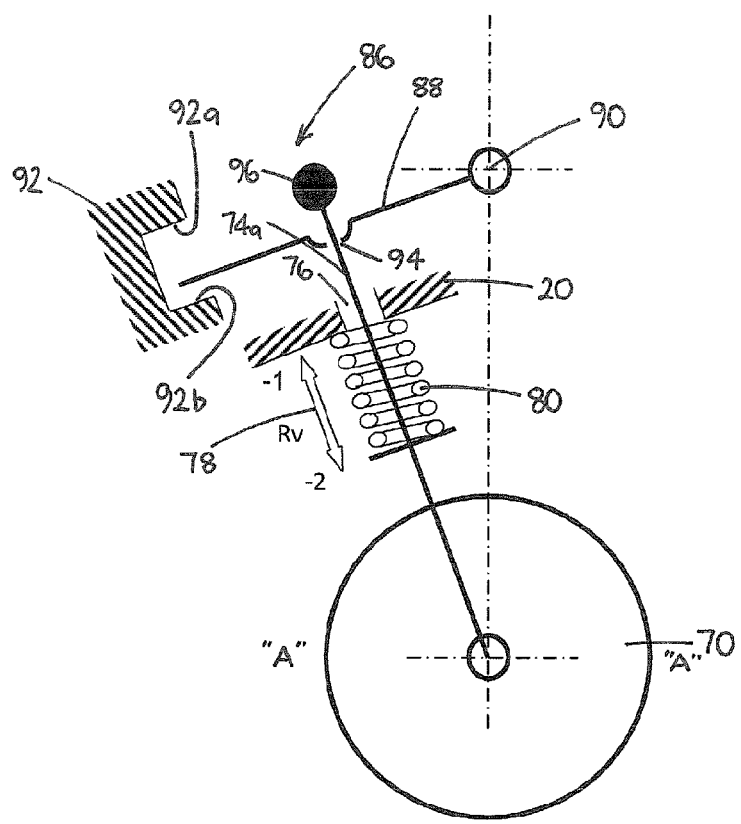
FIG. 6 illustrates the roller control mechanism of a fourth embodiment of variator in accordance with the present invention.

A further embodiment is illustrated in FIG. 6. The embodiment includes all of the features of the FIG. 4 embodiment (and, optionally, the FIG. 5 variant) but in addition includes a ratio limiting means 86. The ratio limiting means comprises a plate 88 which is pivotally mounted at pivot 90 to the variator housing 20. The rotation of the plate is limited in both directions by means of stop surfaces 92a, 92b of the stop member 92. The roller carriage rod 74a passes through a guide aperture 94 in the plate 88 and is prevented from passing completely through the plate by a stop member 96 affixed to one end.

The roller 70 is constrained by its two point contacts "A" with the input and output discs 10, 12 and the aperture 76 through which the roller carriage rod 74a passes. The roller carriage rod 74a has a certain amount of freedom in the aperture 76 since the roller precesses round the toroid as a function of ratio.

Rotation of the plate 88 about pivot 90 applies a travel limit to the roller. The rotation of the plate can be achieved by an external control function or, more simply, by a mechanical linkage (e.g. a cable) to the throttle pedal of the vehicle in which the variator and supercharger are fitted. For example, if the plate 88 is connected to the throttle pedal, as the pedal travel increases the plate rotates downwardly (anticlockwise in FIG. 6), allowing the full variator ratio spread. At light throttle pedal settings, the downward plate rotation is small and if the plate 88 engages the stop member 96 on the end of the roller carriage rod 74a, it urges the roller upwards, against the restoring force of the spring 80, towards the minimum ratio position. When the variator ratio is restricted in this way, it is not possible to overspeed the supercharger, even with a reduced air mass flow. However, the impeller of the supercharger is still being driven (i.e. it is not disconnected), so that response to an increased throttle pedal demand will be quick.

The use of torque control still protects against transients since the variator is able to reach ratios lower than the limiting value. A default position that restricts the ratio to its minimum value creates a failsafe situation such that the supercharger can never be oversped.

Figure 7:
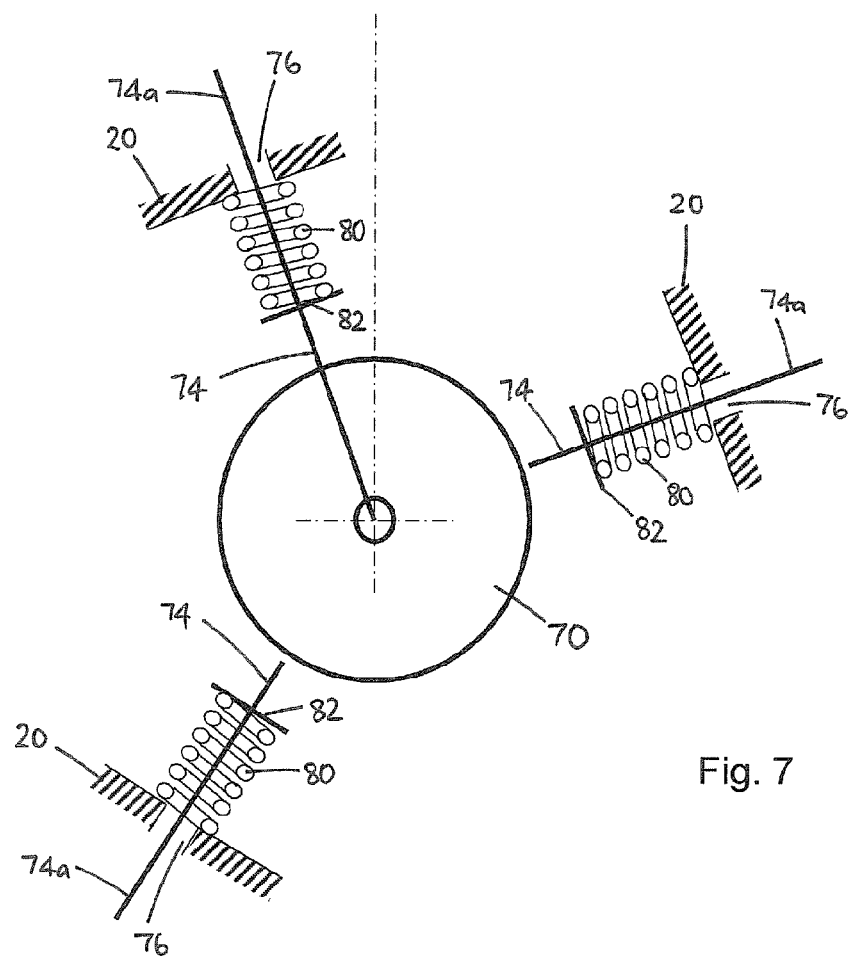
FIG. 7 illustrates the roller control mechanism of a fifth embodiment of variator in accordance with the present invention.

The embodiment of FIG. 7 is a variant of FIG. 4 embodiment and shows that the principle is applicable to a plurality of rollers (in this case three, but it could be a higher or lower number such as 2 or 4). The variant shows three identical rollers 70, each of which has an identical roller carriage 74 and is provided with an identical compression spring 80. Each roller 70 moves independently of the others and thus any imbalances in the system can be absorbed.

Figure 8:
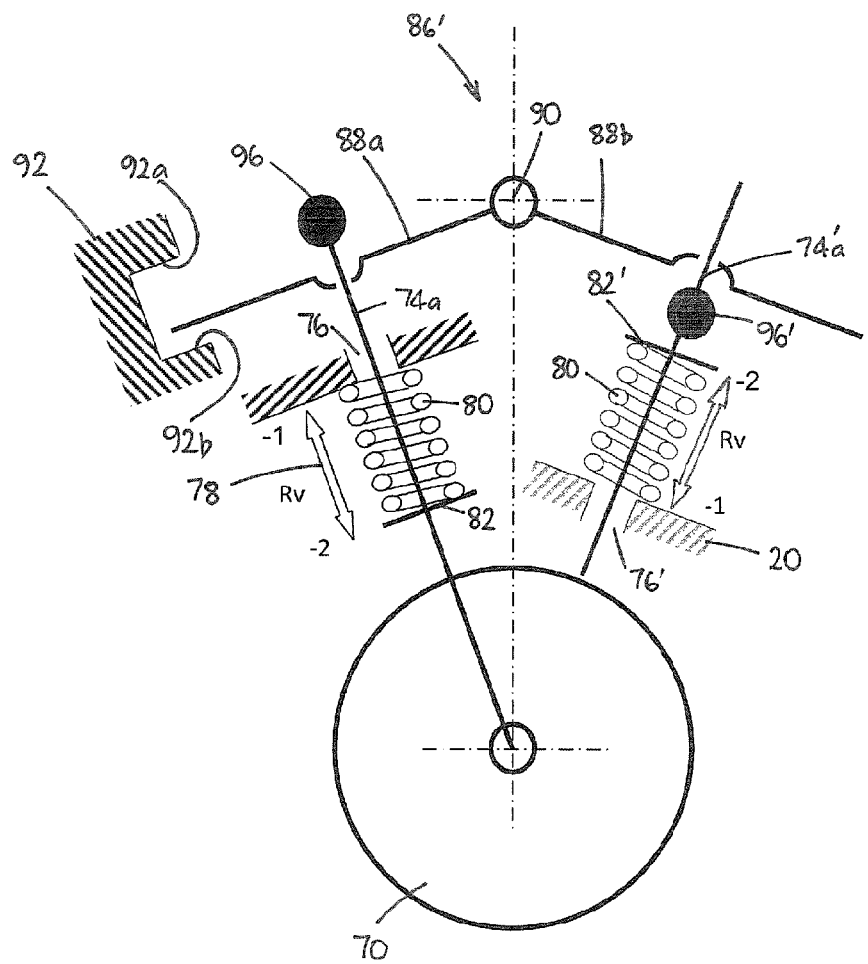
FIG. 8 illustrates the roller control mechanism of a sixth embodiment of variator in accordance with the present invention.

The embodiment of FIG. 8 is a variant of the FIG. 6 embodiment, in which a ratio limiting means 86' is applied to the roller carriage rods 74a of two rollers 70 (only one of which is visible in the drawing). The ratio limiting means 86' comprises a plate 88' having two plate portions 88a, 88b connected together and pivotable about a common pivot 90. The plate portion 88a is identical to the plate 88 of the FIG. 6 embodiment. However, the arrangement of the plate portion 88b and the associated carriage rod 74a is "reversed". In particular, the stop member 96' on the carriage rod 74a associated with the plate portion 88b is located part-way along the carriage rod and is adapted to engage the undersurface of the plate portion 88b. In addition, it will be noted that the stop 82' on the carriage rod 74 is adjacent to the stop member 96' and is arranged outwardly of the portion of the housing engaged by the spring 80. Consequently, inward movement of the carriage rod 74a compresses the spring 80. This is necessary since the two rollers 70 move in opposite directions to increase or decrease the variator ratio.

The plate portions 88a, 88b pivot together and the plate portion 88a is engageable with the stop surfaces 92a, 92b of the stop member, as in the FIG. 6 embodiment.

Figure 9:
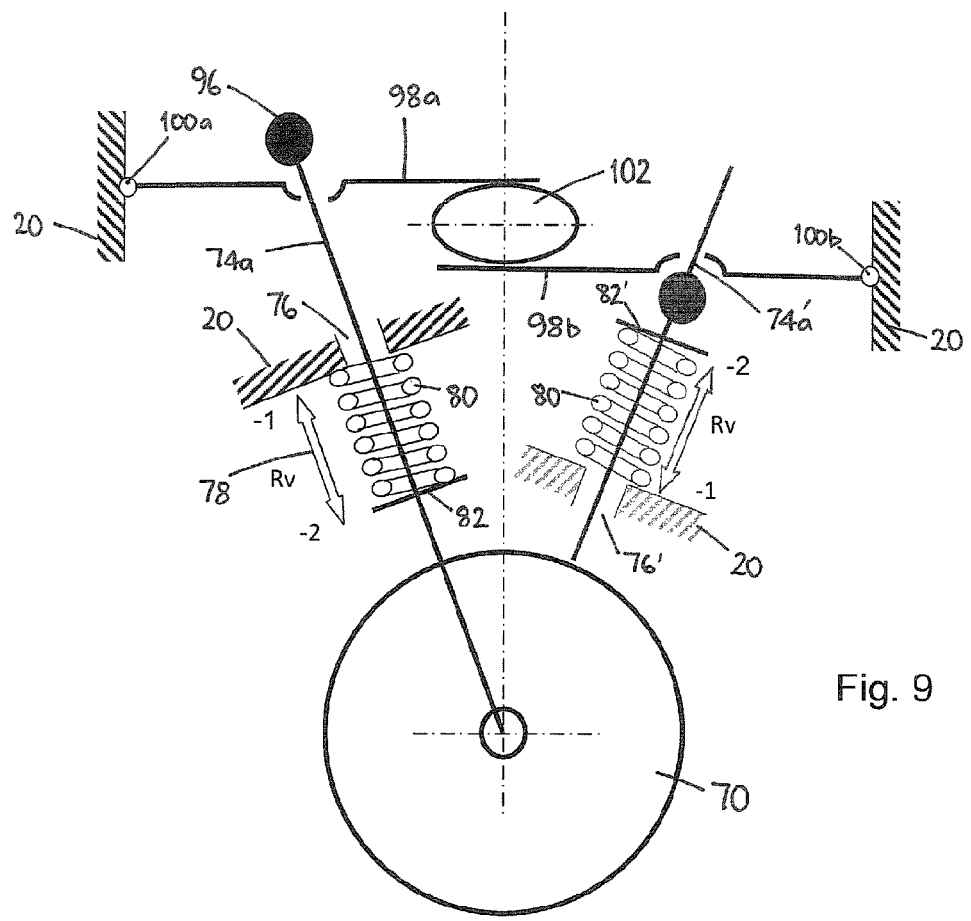
FIG. 9 illustrates the roller control mechanism of a seventh embodiment of variator in accordance with the present invention.

FIG. 9 shows a variant of the FIG. 8 arrangement, in which separate plates 98a, 98b are provide for the individual roller carriage rods 74a, each plate being separately pivotally mounted at pivot 100a, 100b to the variator housing 20. A cam 102 engages the undersurface of plate 98a and the upper surface of the plate 98b. The cam produces a ratio limiting function, as in FIG. 8, but the ratio limiting is adjustable by adjusting the rotational position of the cam 102.

In the embodiments of FIGS. 8 and 9 only two rollers have been illustrated, but three or four rollers could be included instead of two.

Figure 10:
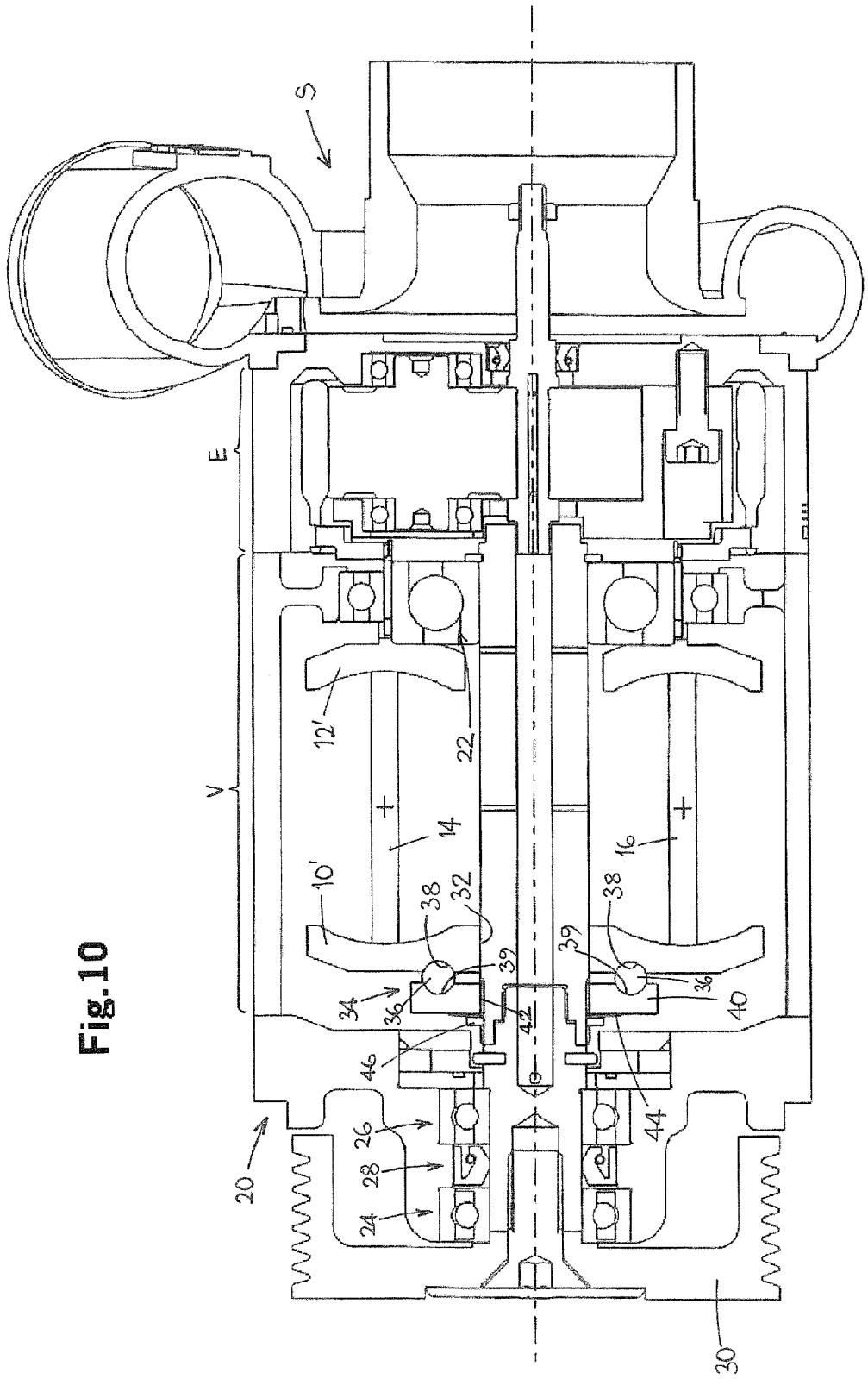
FIG. 10 is a longitudinal cross section through an eighth embodiment of variator driving a supercharger, in accordance with the present invention.

A further embodiment of the present invention is illustrated in FIG. 10. This embodiment is very similar to that of FIG. 1 and the same reference numerals have been used to denote the same features and the same reference numerals with the addition of a prime (') have been used to denote similar features. Moreover, the embodiments of FIGS. 4 to 9, which relate to the roller control mechanism, are applicable to the embodiment of FIG. 10 in the same way as for the embodiment of FIG. 1 (but with a different ratio spread, as will be explained).

The main difference between the embodiments of FIGS. 1 and 10 is that the ratio spread is increased. In the FIG. 1 embodiment, the roller-engaging faces of the input and output discs 10, 12 are not identical. The variator in that embodiment is arranged to have a ratio spread from −1 to −2, such that the ratio was −1 when the rollers 14, 16 are in contact with the smallest diameter of the input disc 10 and the largest diameter of the output disc 12. In the FIG. 10 embodiment, the ratio spread is increased to −0.4 to −2.5. Consequently, the maximum and minimum values of Rv shown in FIGS. 4 to 9 are increased and the shape of the opposed faces of the input and output discs 10', 12' are arranged to allow the increased ratio spread (in fact, the opposed faces are identical in the FIG. 10 embodiment).

The invention is not restricted to the details of the foregoing embodiments. For example, end load mechanism other than the end load mechanism described could be used. Moreover, the invention is applicable to a variator having 2, 3 or more rollers in contact with the input and output discs 10, 12 and/or for variators having more than one toroidal cavity.

The invention claimed is:

1. A variable-drive auxiliary engine appliance comprising, in combination:
a variator; and
an auxiliary engine appliance driven by the variator, wherein the auxiliary engine appliance comprises a supercharger which is adapted to supply air for combustion to an input of an internal combustion engine, the supercharger comprising an impeller, the variator comprising:
an input shaft adapted to be driven by the internal combustion engine;
an input disc mounted coaxially with the input shaft and rotatable by the input shaft;
an output disc facing the input shaft and being mounted coaxially with the input disc, the output disc being connected to the auxiliary engine appliance;
a toroidal cavity defined between the input and output discs;
a plurality of rollers located in the toroidal cavity, in rolling contact with the input and output discs; and
means for applying an end load to the variator to urge the rollers into contact with the input and output discs;
wherein the means for applying an end load also transfers torque from the input shaft to the input disc and/or transfers torque from the output disc to the output shaft.

2. A variable-drive auxiliary engine appliance as claimed in claim 1, wherein each of the rollers is mounted on a roller carriage and the variator further comprises:
resiliently deformable means for applying a reaction force to each of the roller carriages.

3. A variable-drive auxiliary engine appliance as claimed in claim 2, wherein the resiliently deformable means comprises spring means.

4. A variable-drive auxiliary engine appliance as claimed in claim 2, wherein the variator further comprises stop means for limiting the travel of the roller carriages.

5. A variable-drive auxiliary engine appliance as claimed in claim 4, wherein a common stop means limits the travel of a plurality of roller carriages.

6. A variable-drive auxiliary engine appliance as claimed in claim 4, wherein the stop means comprises a pivotally mounted member through which the roller carriage passes, the roller carriage having an engagement portion which limits the extent to which the roller carriage can pass through the pivotally mounted member and the pivotally mounted member being engageable with one or more abutment means which limit its pivotal movement.

7. A variable-drive auxiliary engine appliance as claimed in claim 2, wherein the variator further comprises damping means for damping the motion of the roller carriage.

8. A variable-drive auxiliary engine appliance as claimed in claim 1, wherein the input disc is angularly displaceable with respect to the input shaft, and the variator further comprises:
roller carriage means on which the rollers are mounted; and
means for adjusting the roller carriage means to set the inclination of the rollers;
wherein the means for applying an end load comprise end load means mounted on the input shaft for rotation therewith, the end load means acting on the input disc to urge the rollers and the input and output discs into contact and also transferring torque from the input shaft to the input disc.

9. A variable-drive auxiliary engine appliance as claimed in claim 8, wherein the end load means comprises abutment means rotatable with, and displaceable longitudinally with respect to, the input shaft and angularly displaceable with respect to the input disc, and camming means for displacing the abutment means longitudinally with respect to the input shaft on relative angular displacement of the abutment means and the input disc.

10. A variable-drive auxiliary engine appliance as claimed in claim 9, wherein the camming means comprises a plurality of rotatable elements, each of which is movable along a track of varying depth located in the abutment means by relative angular displacement of the abutment means and the input disc.

11. A variable-drive auxiliary engine appliance as claimed in claim 10, wherein the variator further comprises a track of varying depth located in an outer face of the input disc.

12. A variable-drive auxiliary engine appliance as claimed in claim 9, wherein the abutment means comprises plate means slidably disposed on the input shaft.

13. A variable-drive auxiliary engine appliance as claimed in claim 1, wherein each of the rollers is mounted on a roller carriage which is disposed at an angle relative to a plane parallel with the discs.

14. A variable-drive auxiliary engine appliance as claimed in claim 1, wherein the variator further comprises means for adjusting the roller carriages to set the inclination of the rollers.

15. A variable-drive auxiliary engine appliance as claimed in claim 4, wherein the travel of the roller carriages is limited in a first and/or a second direction to restrict a range of variator ratio, the stop means being arranged to respond to an external control function associated with the auxiliary engine appliance.

16. A variable-drive auxiliary engine appliance as claimed in claim 1, wherein the input and output discs comprise respective, non-identical profiled inner faces.

17. A variable-drive auxiliary engine appliance comprising, in combination:
an auxiliary engine appliance; and
a variator for driving the auxiliary engine appliance, the variator comprising:
an input shaft adapted to be driven by an internal combustion engine;
an input disc mounted coaxially with the input shaft and rotatable by the input shaft;
an output disc facing the input shaft and being mounted coaxially with the input disc, the output disc being connected to the auxiliary engine appliance;
a toroidal cavity defined between the input and output discs;
a plurality of rollers located in the toroidal cavity, in rolling contact with the input and output discs, each of the rollers being mounted on a roller carriage;
a means for applying an end load to the variator to urge the rollers into contact with the input and output discs; and
resiliently deformable means for applying a reaction force to each of the roller carriages.

18. A variable-drive auxiliary engine appliance as claimed in claim 17, wherein the auxiliary engine appliance comprises a supercharger adapted to supply air for combustion to an input of an internal combustion engine, the supercharger comprising an impeller.

19. A variable-drive auxiliary engine appliance as claimed in claim 17, wherein the variator comprises a torque-controlled variator.

20. A variator transmission for an auxiliary engine appliance, the auxiliary engine appliance comprising a supercharger adapted to supply air for combustion to an input of an internal combustion engine, the supercharger comprising an impeller, the variator transmission comprising a variator as claimed in claim 1.

21. A variable-drive auxiliary engine appliance as claimed in claim 1, wherein the variator comprises a torque-controlled variator.

22. A variable-drive auxiliary engine appliance as claimed in claim 17, wherein the means for applying an end load also transfers torque from the input shaft to the input disc and/or transfers torque from the output disc to the output shaft.

* * * * *